United States Patent
Kramer et al.

(10) Patent No.: US 6,738,810 B1
(45) Date of Patent: May 18, 2004

(54) METHOD AND APPARATUS FOR ENCOURAGING TIMELY PAYMENTS ASSOCIATED WITH A COMPUTER SYSTEM

(75) Inventors: Gerald Arthur Kramer, Carmel, IN (US); Eric Scott Whitlow, Greenfield, IN (US)

(73) Assignee: D. Michael Corporation, Fishers, IN (US)

( * ) Notice: Subject to any disclaimer, the term of this patent is extended or adjusted under 35 U.S.C. 154(b) by 0 days.

(21) Appl. No.: 09/433,168

(22) Filed: Nov. 3, 1999

(51) Int. Cl.⁷ .................................. G06F 15/00
(52) U.S. Cl. .............. 709/224; 705/40; 713/202; 340/825.33
(58) Field of Search ............... 705/40, 13; 340/825.33, 340/825.34, 825.22; 702/78; 709/224, 217; 379/144; 713/202

(56) References Cited

U.S. PATENT DOCUMENTS

| | | |
|---|---|---|
| 3,665,397 A | 5/1972 | De Napoli et al. |
| 3,790,933 A | 2/1974 | Cort |
| 3,987,408 A | 10/1976 | Sassover et al. |
| 4,067,411 A | 1/1978 | Conley et al. |
| 4,177,466 A | 12/1979 | Reagan |
| 4,291,237 A | 9/1981 | Kitano |
| 4,327,353 A | 4/1982 | Beard et al. |
| 4,366,466 A | 12/1982 | Lutz |
| 4,381,705 A | 5/1983 | Roes et al. |
| 4,463,340 A | 7/1984 | Adkins et al. |
| 4,553,511 A | 11/1985 | Hayakawa et al. |
| 4,616,208 A | 10/1986 | Nakamura |
| 4,624,578 A | 11/1986 | Green |
| 4,630,201 A | 12/1986 | White |
| 4,777,377 A | 10/1988 | Jeter |
| 4,804,937 A | 2/1989 | Barbiaux et al. |
| 4,805,722 A | 2/1989 | Keating et al. |
| 4,926,332 A | 5/1990 | Komuro et al. |
| 4,990,890 A | 2/1991 | Newby |
| 4,995,086 A | 2/1991 | Lilley et al. |
| 5,023,605 A | 6/1991 | McColl |
| 5,089,762 A | 2/1992 | Sloan |
| 5,124,920 A | 6/1992 | Tamada et al. |
| 5,289,369 A | 2/1994 | Hirshberg |
| 5,396,215 A | 3/1995 | Hinkle |
| 5,491,325 A | 2/1996 | Huang et al. |
| 5,519,260 A | 5/1996 | Washington |
| 5,594,284 A | 1/1997 | Hill et al. |
| 5,602,426 A | 2/1997 | Ecker |
| 5,631,962 A | 5/1997 | Balph et al. |
| 5,661,451 A | 8/1997 | Pollag |
| 5,665,397 A | 9/1997 | Fisher et al. |
| 5,686,765 A | 11/1997 | Washington |
| 5,715,905 A | 2/1998 | Kaman |
| 5,812,067 A | 9/1998 | Bergholz et al. |
| 5,812,252 A | 9/1998 | Bowker et al. |

(List continued on next page.)

FOREIGN PATENT DOCUMENTS

| | | |
|---|---|---|
| EP | 0320470 | 6/1989 |
| JP | 58-180349 | 10/1983 |
| WO | WO 96/19360 | 6/1996 |

*Primary Examiner*—Richard Chilcot
(74) *Attorney, Agent, or Firm*—Bose McKinney & Evans LLP

(57) ABSTRACT

A method of encouraging timely period payments that are associated with a computer system includes the step of storing passwords in the computer system wherein each password is associated with a separate payment period. Another step of the method includes determining based upon the passwords stored in the computer system whether a supplied password corresponds to a current payment period. The method also includes enabling use of the computer system based upon determining that the supplied password corresponds to the current payment period. The method may further include the step of disabling use of the computer system based upon determining that the supplied password does not correspond to the current payment period.

27 Claims, 7 Drawing Sheets

U.S. PATENT DOCUMENTS

| | | |
|---|---|---|
| 5,819,869 A | 10/1998 | Horton |
| 5,841,363 A | 11/1998 | Jakob et al. |
| 5,867,802 A | 2/1999 | Borza |
| 5,930,777 A | 7/1999 | Barber |
| 5,942,985 A | 8/1999 | Chin |
| 5,945,906 A | 8/1999 | Onuma |
| 5,964,877 A | 10/1999 | Victor et al. |
| 5,969,633 A | 10/1999 | Rosler |
| 5,973,411 A | 10/1999 | Tado et al. |
| 6,195,648 B1 * | 2/2001 | Simon et al. .................. 705/40 |

* cited by examiner

METHOD AND APPARATUS FOR ENCOURAGING TIMELY PAYMENTS ASSOCIATED WITH A COMPUTER SYSTEM

FIELD OF THE INVENTION

The present invention relates to payment monitoring systems, and more particularly to encouraging timely periodic payments by automatically disabling a computer system if an periodic payment is not timely received.

BACKGROUND OF THE INVENTION

Computer systems are often purchased on time or leased over an extended period. Alternatively, computer systems are often packaged free or at a minimal cost with other products such as software licenses or with other services such as Internet services. Whether organizations collect payments for the computer system itself or for products/service packaged with the computer system, consumers often procure computer systems with little or no money down. In such cases, the organizations providing the consumers with the computer systems depend greatly upon receiving timely periodic payments from their costumers on a periodic basis in order to remain profitable. Due to their dependence on timely periodic payments, these organizations appreciate cost effective mechanisms which increase the likelihood of receiving timely periodic payments from their customers.

Accordingly, a need exists for a cost effective mechanism which increases the likelihood of receiving in a timely manner periodic payments associated with a computer system.

SUMMARY OF INVENTION

The present invention addresses the above-identified need, as well as others, with a method and apparatus of automatically disabling a computer system in the event of untimely or none payment of a periodic fee. In accordance with one embodiment of the present invention, there is provided a method of encouraging timely periodic payments associated with a computer system. The method includes the step of storing passwords in the computer system wherein each password is associated with a separate payment period. Another step of the method includes determining based upon the passwords stored in the computer system whether a supplied password corresponds to a current payment period. The method also includes enabling use of the computer system based upon determining that the supplied password corresponds to the current payment period.

Pursuant to another embodiment of the present invention, there is provided a computer system that encourages timely periodic payments. The computer system includes a non-volatile storage medium, a system clock, a processor, and memory. The non-volatile storage medium includes passwords in which each password is associated with a separate payment period, and the system clock is operable to provide a system time. The processor is operably coupled to the non-volatile storage medium, the system clock, and the memory. The memory includes instructions, which when executed by the processor cause the processor to determine based upon the system time and the plurality of passwords whether a supplied password corresponds to a current payment period. The instructions of the memory when executed by the processor further cause the processor to enable execution of user processes based upon determining that the supplied password corresponds to the current payment period.

Pursuant to a further embodiment of the present invention, there is provided a computer readable medium for encouraging timing periodic payments associated with a computer system. The computer readable medium includes instructions which when executed by the computer system cause the computer system to determine based a group of passwords associated with a group of payment periods whether a supplied password corresponds to a current payment period. The instructions when executed by the computer system further cause the computer system to enable use of the computer system based upon determining that the supplied password corresponds to the current payment period.

It is an object of the present invention to provide an improved method and apparatus for encouraging timely periodic payments that are associated with a computer system.

It is also an object of the present invention to provide a new and useful for encouraging timely periodic payments that are associated with a computer system.

It is another object of the present invention to provide a method and apparatus which disable use of a computer system in order to encourage timely periodic payments.

It is yet another object of the present invention to provide a method and apparatus which encourages timely periodic payments without being overly intrusive if timely periodic payments are made.

It is a further object of the present invention to provide a method and apparatus for cost effectively encouraging timely periodic payments associated with a computer system.

The above and other objects, features, and advantages of the present invention will become apparent from the following description and the attached drawings.

DETAILED DESCRIPTION OF AN EXEMPLARY EMBODIMENT

Figure 1:
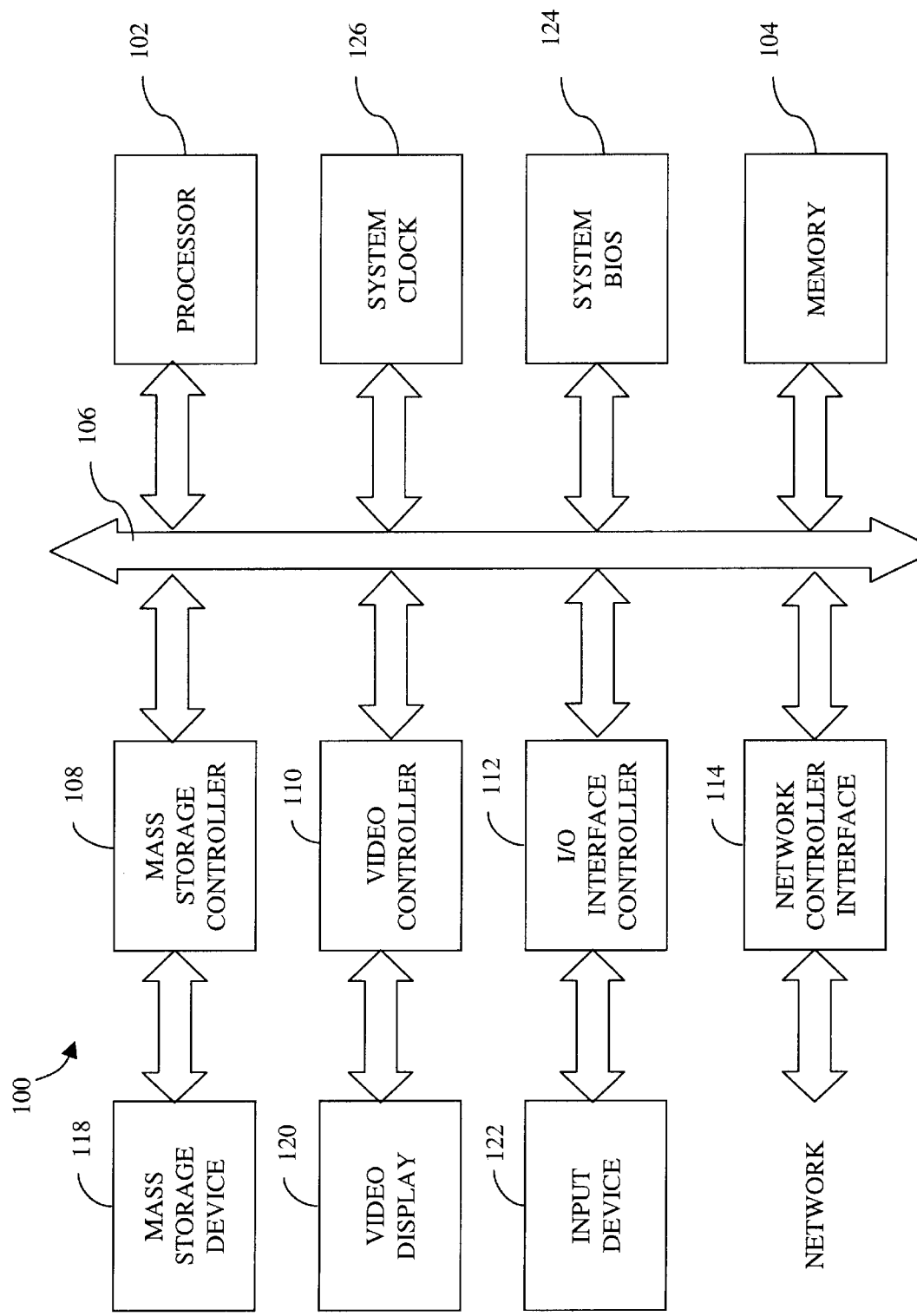
FIG. 1 shows a simplified block diagram of computer system which incorporates various features of the present invention therein.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, an exemplary computer system 100 is shown which incorporates various features of the present invention. The exemplary computer system 100 is generally operable to prevent use of the computer system 100 in response to non-payment or a non-timely payment of a periodic fee. To this end, the computer system 100 includes a processor 102, memory 104, a system bus 106, controllers 108, 110, 112, and 114, devices 118, 120, and 122, system BIOS 124, and a system clock 126. Those skilled in the art should appreciate that features of the present invention may be implemented in a properly programmed general purpose computer system or server; however, those skilled in the art should also appreciate that various features of the present invention may alternatively be implemented in a special purpose device such as Internet appliances, set-top boxes, an medical diagnostic equipment.

The processor 102 of the computer system 100 is generally operable to execute software and/or firmware routines stored in the memory 104. As a result of executing the software and/or firmware routines of the memory 104, the processor 102 controls the general operation of the computer system 100 and the devices 118, 120, 122 via the respective controllers 108, 110, 112, and 114. Moreover, the processor 102 as a result of executing software and/or firmware routines of the memory 104 is operable to prevent the computer system 100 from being used if a periodic payment is missed or is paid in an untimely manner.

The memory 104 of the computer system 100 is operable to store data and instructions used by the processor 102 in the course of ensuring timely periodic payments and in the course general execution of software applications. To this end, the memory 104, in an exemplary embodiment, includes standard random access memory for storing the data and software routines needed by the processor 102. However, the memory 104 may alternatively include other volatile memory types such as DRAM, SDRAM, and SRAM for storing data and software routines and/or non-volatile memory types such as ROMs, PROMs, EEPROMs, and flash memory for storing data and firmware routines.

The system bus 106 is generally operable to interconnect the processor 102, the memory 104, and the controllers 108, 110, 112, and 114. To this end, the system bus 106 in the exemplary embodiment includes an address bus and data bus which enable the various components of the computer system 100 to communicate with one another.

The mass storage device 118 is generally operable to store data and/or software routines of the computer system 100 in a non-volatile manner, and the mass storage controller 108 is generally operable to provide the processor 102 with an interface to the data and/or software routines stored by the mass storage device 118. To this end, the mass storage device 118 may include various computer readable and/or writeable media devices such as hard disk drives, floppy disk drives, CD-ROM drives, DVD-RAM drives, RAID devices, and/or Disk-On Chip devices to name a few. It should be appreciated by those skilled in the art that the computer system 100 may be implemented without a mass storage device 118 and mass storage controller 108. For example, the computer system 100 may be implemented with all supported applications stored in a non-volatile memory of the memory 104.

The video display device 120 is operable to provide a visual display to a user of the computer system 100, and the video controller 110 is operable to provide the processor 102 with an interface 30 to the video display device 120. To this end, the video display device 120 may include CRT displays, LCD displays, and/or LED displays.

The input device 122 is operable to provide users with a mechanism for inputting information into the computer system 100, and the I/O interface controller 112 is operable to provide the processor 102 with an interface to the input device 122. To this end, the input device 122 may include a mouse, keyboard, touch pad, and/or touch screen to name a few types of suitable input devices.

The system BIOS 124 provides the computer system 100 with basic input and output routines. In particular, the system BIOS 124 provides the computer system 100 with startup routines used to initialize hardware components of the computer system 100. Moreover, the system BIOS 124 provides the computer system 100 with a hardware setup program which enables a technician to setup certain hardware components of the computer system 100 such as the system clock 126, and interface controllers for controlling floppy drives, hard drives, and CD-ROM drives. Furthermore, the hardware setup program of the system BIOS 124 provides an interface for defining from which devices the computer system 100 will attempt to boot and the order of the devices from which the computer system 100 will attempt to boot.

The system clock 126 essentially maintains date and time information for the computer system 100. In particular, the system clock 126 includes an oscillator and other hardware which in combination implement a conventional date and time clock for the computer system 100. The system clock 126 typically operates from battery power so that the system clock 126 may continue to keep time even after the computer system 100 is powered off.

The network interface controller 114 is generally operable to provide the processor 102 with an interface to devices coupled to a network (not shown) such as a LAN or the Internet. To this end, the network interface controller 114 may include an analog modem, an ISDN modem, a DSL interface, an Ethernet controller, and/or other wired/wireless communication interfaces.

The computer system 100 in an exemplary embodiment executes a payment assurance application which is depicted in detail in FIGS. 2–6. In general, the payment assurance application configures the computer system 100 to prevent use of the computer system 100 if a periodic payment has not been made in a timely manner. To this end, the payment assurance application attempts to configure the exemplary computer system 100 to provide a computing environment which allows a user to use the computer system 100 with minimal interference while at the same time making it difficult for the average user to circumvent the protection provided by the payment assurance application. Similar to locks on an automobile, the obstacles presented to an individual are sufficient to deter most into compliance; however, sophisticated individuals determined to gain unwarranted access at all costs are likely to succeed in finding a way to circumvent the obstacles. With this in mind, design choices were made during the development of the exemplary payment assurance application to lessen either (i) the amount of interference and intrusiveness caused by the payment assurance application, or (ii) the complexity and expense associated with implementing the payment assurance application, at the expense of the level of security provided by the payment assurance application. Accordingly, those skilled in the art may chose to provide additional or alternative safeguards than those described herein.

Figure 2:
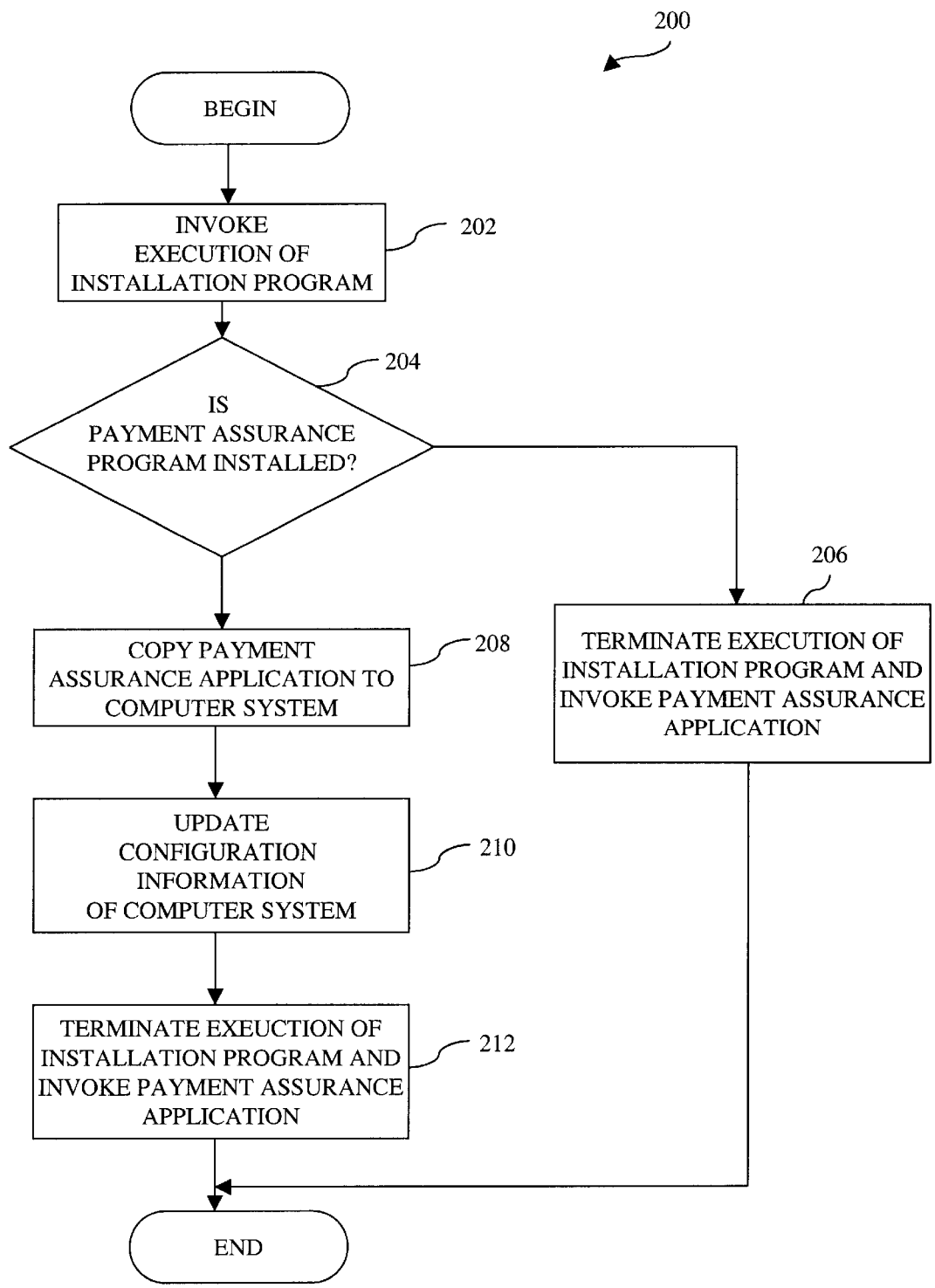
FIG. 2 shows a flowchart of an installation method used to install a payment assurance application upon the computer system of FIG. 1.

Shown in FIG. 2 is a flowchart of an exemplary installation method 200 for installing the payment assurance application upon the exemplary computer system 100 of FIG. 1. In general, the installation method 200 causes the computer system 100 to copy an exemplary payment assurance application to the computer system 100 and perform some initial configuration of the payment assurance application. To this end, the computer system in step 202 invokes execution of an installation program stored on a computer readable medium such as a CD-ROM disc or a floppy disk. As a result of executing the installation program, the computer system 100 in step 204 determines whether the payment assurance application is already installed on the computer system 100. To this end, the computer system 100 may make this determination based upon several known techniques such as determining whether certain executables are available to the computer system 100 and/or determining whether certain configuration parameters are set in the computer system 100.

If the computer system in step 204 determines that the payment assurance application is already installed on the computer system 100, then the computer system 100 in step 206 terminates execution of the installation program and causes the computer system 100 to invoke execution of the payment assurance application. In particular, the computer system 100 in an exemplary embodiment invokes execution of reboot operation which causes the computer system to execute a shutdown process and a subsequent a system startup process that invokes the payment assurance application.

However, if the computer system in step 204 determines that the payment assurance application is not installed on the computer system 100, then the computer system 100 installs the payment assurance application on the computer system 100. To this end, the computer system 100 in step 208 copies the payment assurance application to the computer system 100 in a persistent manner. For example, in an exemplary embodiment, the computer system 100 copies the payment assurance application to the mass storage device 118. Those skilled in the art should appreciate that depending upon the implementation of the payment assurance application, the computer system 100 may need to copy one or more files. For example, the payment assurance application may be implemented as a single executable that does not require any other files, or the payment assurance application may be implemented as one or more executable files that are dynamically linked to several library files and that each rely upon various data and configuration files for proper execution.

Besides causing the computer system 100 to copy the payment assurance application to the computer system 100 in a persistent manner, the installation program further causes the computer system 100 in step 210 to update configuration information so that during a system startup process the computer system 100 invokes execution of a login service provided by the payment assurance application. While various known techniques may be used to configure the computer system 100 to invoke upon system startup the login service of the payment assurance application, the installation program, in an exemplary Microsoft™ Windows™ embodiment of the payment assurance application, causes the computer system 100 to add appropriate references to the payment assurance application in the "Run" key and the "RunOnce" key of the Registry Database. In particular, the entry in the "RunOnce" causes the computer system 100 to invoke the login service of the payment assurance application upon system startup of the computer system 100 and prevents the computer system 100 from completing the startup process until execution of the payment assurance application is terminated. Moreover, since programs referenced by the "RunOnce" key in a Microsoft™ Windows™ environment are executed early in the system startup process, the payment assurance application configures the computer system 100 to implement features of the payment assurance application before a user may input commands to the computer system 100. For example, in an exemplary Microsoft™ Windows™ embodiment, the program assurance application causes the computer system 100 to disable certain keys and/or key combinations such as the "Alt-Tab", "F6", "Ctrl-Esc", "Alt-F4", and "Ctrl-Alt-Delete" which may otherwise enable a user to circumvent the program assurance application by causing the computer system 100 to switch to another executing process or causing the computer system 100 to terminate execution of the programs assurance program.

Another advantage of causing the payment assurance application to be executed via the entries in the "Run" key and "RunOnce" key is that these entries cause the computer system 100 to execute the payment assurance application as a service. In Microsoft™ Windows™ environments, services are not listed by the Task Manager of Microsoft™ Windows™ operating systems. The Task Manager of the Microsoft™ Windows™ operating systems provides users with a interface to terminate processes; however, since the payment assurance application is executed as a non-listed service, users are prevented from simply terminating the payment assurance application via the Task Manager in order to circumvent the protections provided by the payment assurance application. The installation program then in step 210 causes the computer system 100 to reboot in order to force the computer system 100 through the system startup process. Due to the above installation of the payment assurance application, the computer system 100 will begin execution of the payment assurance application as part of the system startup process.

The installation program then in step 212 causes the computer system 100 to terminate execution of the installation program and to invoke execution of the payment assurance application. To this end, the computer system 100 in an exemplary embodiment invokes a reboot operation that causes the computer system to terminate all processes and to subsequently invoke execution of the payment assurance application as part of a startup operation. As a result of invoking the reboot operation, the computer system 100 terminates all executing processes and then invokes a system startup process. Since the above installation of the payment assurance program configured the computer system 100 to invoke execution of the login service of the payment assurance program upon system startup, rebooting the computer system 100 in step 212 effectively invokes the payment assurance application and the protections associated with the payment assurance application.

While not part of the exemplary installation program, a technician who is configuring the computer system 100 may perform further actions in order to enhance the protection provided by the payment assurance application. In particular, the technician may configure the computer system 100 via the setup program of the system BIOS 124 to attempt to boot from the mass storage device 118 before attempting to boot from another device. In this manner, the technician prevents a user from circumventing the payment assurance application by simply booting the computer system 100 from a removable media such as a floppy disk or a CD-ROM disc. Furthermore, the technician may password protect the setup program of the system BIOS 124 to prevent users from circumventing the payment assurance application by reconfiguring the computer system 100 to attempt to boot from a removable media before attempting to boot from the mass storage device 118.

Moreover, while the exemplary payment assurance application was described above as being installed on the mass storage device 118, the payment assurance application may take alternative forms which would not require installing the payment assurance application to the mass storage device 118. For example, the payment assurance application may be implemented in non-volatile memory of the computer system 100 and/or as part of the system BIOS 124. Furthermore, in such implementations, the computer system 100 may not need to execute an installation program in order to install the payment assurance application since the functionality of the payment assurance application is already integrated into the hardware components of the computer system 100.

Figure 3:
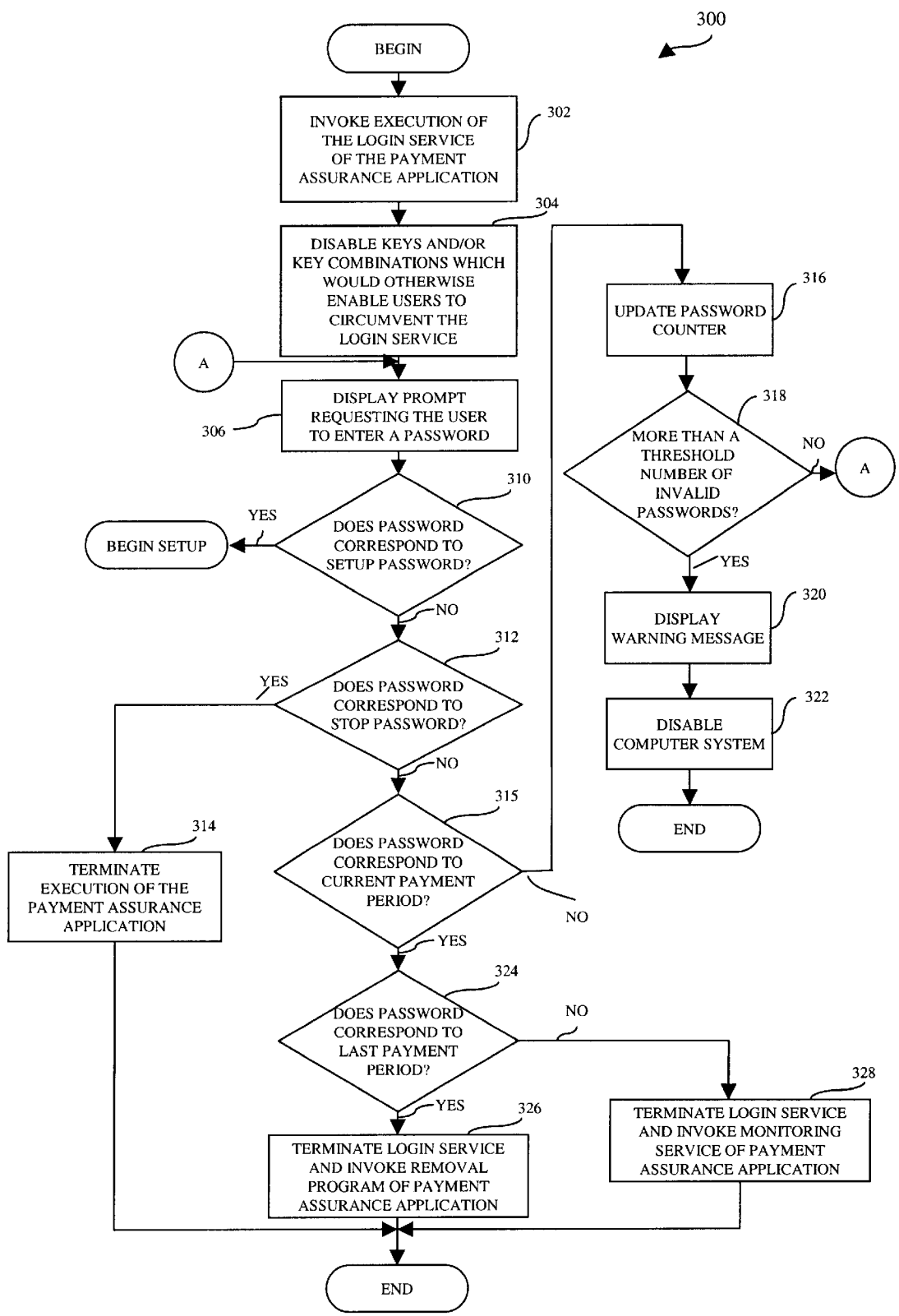
FIG. 3 shows a flowchart of a login service of the payment assurance application installed on the computer system of FIG. 1.

After being configured with the payment assurance application, the computer system 100 in step 302 of FIG. 3 automatically executes a login service of the payment assurance program as part of the startup process. The exemplary login service of the payment assurance application causes the computer system 100 in step 304 to disable certain keys and/or key combinations of the keyboard which would enable a user to switch to another process or prematurely terminate the payment assurance program. For example, in the Microsoft™ Windows™ environment, the exemplary assurance application causes the computer system 100 to disable the "Alt-Tab", "F6", "Ctrl-Esc", "Alt-F4", and "Ctrl-Alt-Delete" keys and/or key combinations which may otherwise enable users to circumvent the login service of the payment assurance application by causing the computer system 100 to switch to another executing process or causing the computer system 100 to prematurely terminate the execution of the payment assurance application.

The login service of the payment assurance application causes the computer system 100 in step 306 to display upon the video display 120 a prompt flora password. In particular, the computer system 100 in an exemplary embodiment displays a dialog box in which a user may type a password. Each time a periodic payment is received by the organization responsible for monitoring payments associated with the computer system 100, the organization supplies the user via mail, e-mail, or some other mechanism, the password associated with the next payment period. Accordingly, if the user makes the periodic payments in a timely manner, then the user will obtain the passwords for each payment period in a timely fashion. As will be apparent from the following description, the user will be effectively prevented from using the computer system 100 if the user does not have the appropriate password for the current payment period. Accordingly, if the user does not want to be prevented from using the computer system 100, then the user will be motivated to make the period payments associated with the computer system 100 in a timely manner.

Upon receiving a password, the login service of the payment assurance application causes the computer system 100 in step 310 to determine whether the entered password corresponds to a setup password for the payment assurance application. The computer system 100 may utilize several known techniques for determining whether the entered password corresponds to the setup password for the payment assurance application. For example, the computer system 100 may determine whether the entered password corresponds to the setup password by comparing the entered password to a setup password that is hard-coded into the payment assurance application. Alternatively, the computer system 100 may determine whether the entered password corresponds to the setup password based upon an encrypted setup password which may be stored on the mass storage device 118, non-volatile memory of the computer system 100, or hard-coded into the payment assurance application.

Figure 4:
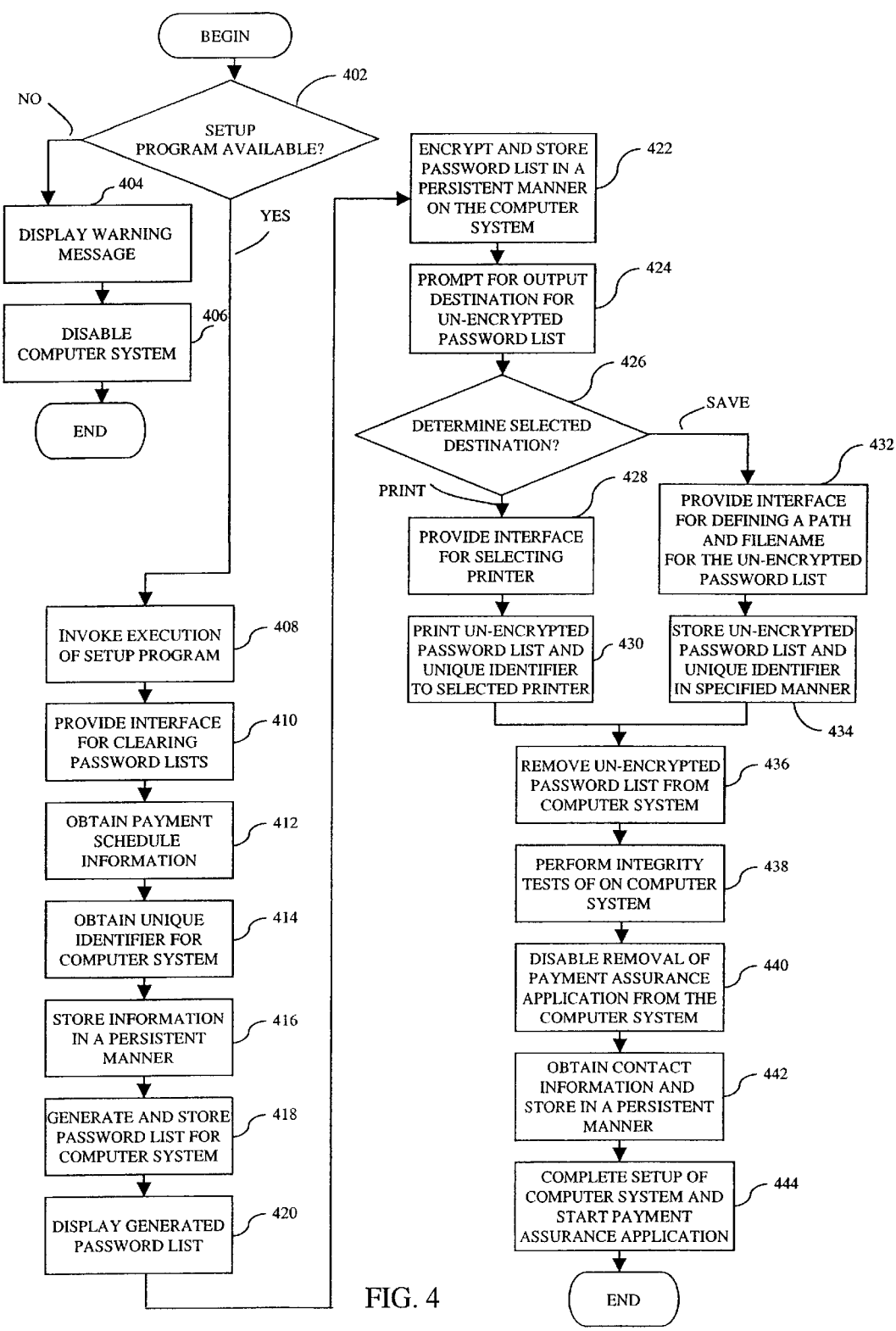
FIG. 4 shows a flowchart of a setup method of the payment assurance application used to configure the payment assurance application installed on the computer system of FIG. 1.

If the computer system 100 in step 310 determines that the user entered the setup password, then the computer system 100 proceeds to step 402 of a setup method 400 depicted in FIG. 4. However, if the computer system 100 in step 310 determines that the user did not enter the setup password, then the computer system 100 in step 312 determines whether the user entered the stop program password. To this end, the computer system 100 may utilize several known techniques for determining whether the entered password corresponds to the stop program password for the payment assurance application. For example, the computer system 100 may determine whether the entered password corresponds to the stop program password by comparing the entered password to a stop program password that is hard-coded into the payment assurance application. Alternatively, the computer system 100 may determine whether the entered password corresponds to the stop program password based upon an encrypted stop program password which may be stored on the mass storage device 118, non-volatile memory of the computer system 100, or hard-coded into the payment assurance application.

If the computer system 100 in step 312 determines that the user entered the stop program password, then the computer system 100 in step 314 terminates execution of the payment assurance application. As a result of terminating execution of the payment assurance application, a user of the computer system 100 regains complete access to the computer system 100. A technician which is attempting to reconfigure a computer system 100 on which the payment assurance application is installed may find it advantageous to cease execution of the payment assurance application in order to regain complete control of the computer system. Assuming that the technician or another user does not reconfigure the computer system 100 to do otherwise, the stop program password does not prevent the computer system 100 from executing the payment assurance application as part of the startup process. In other words, the stop program password merely terminates current execution of the payment assurance application and does not effect future execution of the payment assurance application.

However, if the computer system 100 in step 312 determines that the user did not enter the stop program password, then the computer system 100 in step 315 determines whether the user entered the password for the current payment period. To this end, the exemplary payment assurance application causes the computer system 100 to make this determination based upon the current system time and an encrypted password set stored in the Registry Database of the Microsoft™ Windows™ environment.

If the computer system 100 determines in step 315 that the user did not enter the correct password for the current installment period, then the computer system 100 in step 316 updates a password counter used to track the number of incorrect passwords received by the computer system 100 since the system startup process. Based upon the password counter, the computer system 100 in step 318 determines whether the computer system 100 has received more than a threshold number (e.g. 3) of incorrect passwords. If the computer system 100 determines that not more than the threshold number of incorrect passwords have been received, then the computer system 100 returns to step 306 in order to receive another password.

However, if the computer system 100 determines in step 318 that more than the threshold number of incorrect passwords have been received, then the payment assurance application causes the computer system 100 to display a warning message in step 320. In particular, the warning message, in an exemplary embodiment, provides the user with an indication that the password is incorrect for the current payment period and provides the user with contact information for an organization from which the user may obtain the correct password. After displaying the warning message for a few seconds, the computer system 100 in step 322 disables further use of the computer system 100. To this end, the computer system 100 in an exemplary embodiment invokes a shutdown operation which causes the computer system 100 to terminate all running processes. However, those skilled in the art should appreciate that the computer system 100 may utilize other techniques for disabling the computer system 100. For example, the computer system 100 may be disabled by preventing any further execution of user processes.

If the computer system 100 determines in step 315 that the user entered the correct password for the current payment period, then the computer system 100 in step 324 determines whether the user has made the last payment. To this end, the computer system 100 determines based upon the received password and the encrypted password list for the computer system 100 whether the received password corresponds to the password for the last payment period. If the computer system 100 in step 324 determines that the user has made the last payment, then the computer system 100 in step 326 completes the startup process and invokes execution of the program removal method 600 depicted in FIG. 6.

If the computer system 100, however, determines that the received password is not the last password of the encrypted password set, then the payment assurance application causes the computer system 100 in step 328 to complete the system startup process and invoke a monitoring service of the payment assurance application. To this end, the computer system 100 in an exemplary embodiment updates the "Run" key of the Registry Database to ensure that "Run" key of the Registry Database includes a proper reference to invoke the monitoring service of payment assurance application. After updating the Registry Database, the computer system 100 terminates the current execution of the payment assurance application in order to enable the computer system 100 to complete the system startup procedure. Termination of the payment assurance application causes the computer system 100 to delete the reference to the login service of the payment assurance application from the "RunOnce" key of the Registry Database. Furthermore, as a result of the entry in the "Run" key, the computer system 100 invokes execution of the monitoring service of the payment assurance application depicted in FIGS. 5A–5B upon termination of the login service.

Referring now to FIG. 4, there is depicted a flowchart for a setup method 400 implemented by the computer system 100 in response to determining in step 310 that the setup password was received. In general, the computer system 100 during the setup method 400 provides a technician with a graphical user interface that enables the technician to configure the computer system 100 for a particular payment schedule. To this end, the computer system 100 in step 402 determines whether the setup program is available. In an exemplary embodiment, the payment assurance application is pre-configured to execute the setup program from a particular location on a floppy drive. Accordingly, the computer system 100 determines whether the setup program is accessible from the particular location. If the computer system 100 determines that the setup program is not accessible, then the computer system 100 in step 404 displays a warning message that indicates the user performed a prohibited action. After displaying the warning message for a few seconds, the computer system 100 in step 406 disables use of the computer system 100. To this end, the computer system 100 in an exemplary embodiment invokes a shutdown operation which causes the computer system 100 to terminate all executing processes.

However, if the computer system 100 determines in step 402 that the setup program is accessible, then the computer system 100 in step 408 invokes execution of the setup program. By implementing the setup program as a separate program, the program assurance application introduces additional obstacles for a user who is intent on circumventing the payment assurance application. In particular, a user intent on circumventing the payment assurance application via the setup program would need not only the correct setup password but would also need a copy of the setup program.

In response to executing the setup program, the computer system 100 in step 410 provides a graphical user interface from which a technician may request the computer system 100 to clear any prior password lists installed on the computer system 100. For example, the computer system 100 may detect whether the technician has activated a "Clear Password" button of the graphical user interface and clear any encrypted passwords lists by deleting appropriate keys from the Registry Database of the computer system 100.

The computer system 100 then in step 412 obtains information concerning the payment schedule. In an exemplary embodiment, the computer system 100 provides a graphical user interface from which a technician may define the length of the payment schedule (e.g. 36 months, 102 weeks, etc.); the grace period for receiving each periodic payment (e.g. 10 days); the date the first payment is due (e.g. Jan. 1, 2000); and the day each recurring payment is due (e.g. every Friday, the first of the month, the fifth of the month, etc.). Moreover, the computer system 100 in step 414 obtains a unique identifier for the computer system 100 being configured. In particular, the computer system 100 in an exemplary embodiment provides a graphical user interface from which a technician may enter a unique identifier such as the customer's telephone number. By assigning a unique identifier to the computer system 100, an organization may easily associate a password list with the appropriate computer system.

The computer system 100 in step 416 stores the collected information in a secure and persistent manner. To this end, the computer system 100 in an exemplary embodiment encrypts the collected information with the Blowfish encryption algorithm and stores the encrypted information in keys of the Registry Database that is stored on the mass storage device 118. The computer system 100 alternatively may encrypt the collected information with other algorithms and store the collected information on other non-volatile media such as EEPROMs or flash memory devices. Furthermore, in computing environments that provide built in security measures such file permissions and file ownership, the computer system 100 may store the collected information in a non-encrypted manner in files that are in accessible to users of the computer system 100.

After storing the collected information, the computer system 100 in step 418 generates a password list forthe computer system 100 and saves the password list in a persistent manner. More specifically, the computer system 100 in an exemplary embodiment generates a different password for each payment period and three additional date passwords that enable a user to update the system clock 126 of the computer system 100, and stores the generated password list in a file on the mass storage device 118. Then, the computer system 100 in step 420 displays upon the video display 120 each password of the generated password list. As a result of displaying the password list, the technician may visual verify that appropriate passwords were generated for the computer system 100.

The computer system 100 in step 422 encrypts each generated password with an encryption algorithm such as the DES algorithm, the IDEA algorithm, the RC4 algorithm, or the Blowfish algorithm, and stores the encrypted password list in a persistent manner. In particular, in an exemplary embodiment, the computer system 100 stores the encrypted password list in CLSID keys of the Registry Database without associating meaningful descriptions to the keys. Since the Registry Database typically includes a large number of CLSID keys without highly meaningful descriptions, users in search of the passwords will have a difficult time identifying which CLSID keys of the Registry Database store the encrypted password list for the computer system 100. Moreover, since the passwords are stored in CLSID keys in an encrypted manner, average users would find it very difficult to decrypt the passwords even if they were able to determine in which CLSID keys the encrypted passwords were stored.

The computer system 100 in step 424 prompts the technician via the graphical user interface to indicate whether the computer system 100 should print the password list or save the password list to disk. If the computer system 100 determines in step 426 that the technician chose to have the password list printed, then the computer system 100 in step 428 provides the technician with an interface for choosing a particular printer and causing the selected printer to print the password list along with the unique computer name assigned to the computer system 100. In response to choosing a particular printer, the computer system 100 in step 430 prints the password list for the computer system 100 along with the unique identifier assigned to the computer system 100.

However, if the computer system 100 in step 426 determines that the technician chose to have the password list saved to disk, then the computer system 100 in step 432 provides the technician with a graphical user interface for defining a path and a filename to which the computer system 100 is to save the password list and unique identifier for the computer system 100. In response to defining the path and filename, the computer system in step 434 saves the password list and unique identifier to the a file having the defined filename at a location defined by the path. Saving the password list and unique identifier to disk facilitates additional information retrieval and security functionality not provided by printing the password list and unique identifier. In particular, saved password lists and associated identifiers may be integrated with a database system to provide quick retrieval of passwords for a large inventory of computer systems. Moreover, the saved password lists may be encrypted and password protected in order to secure access to the password lists.

After printing or saving the password list and unique identifier, the computer system 100 in step 436 removes the un-encrypted password list from the computer system 100. More specifically, the computer system 100 in an exemplary embodiment deletes a file containing the un-encrypted password list from the computer system 100 in such a manner which prevents undelete utilities from recovering the file. Removing the un-encrypted password list from the computer system 100 prevents users from simply locating and reading the un-encrypted password list in order to obtain the proper password for each payment period of the payment schedule.

The computer system 100 then in step 438 tests the integrity of the computer system 100 and the configuration of the payment assurance application. To this end, the computer system 100 in an exemplary embodiment tests the integrity of the mass storage device 118, the integrity of the Registry Database, and the integrity of the decryption algorithms. For example, the computer system 100 in an exemplary embodiment verifies that the encrypted passwords can be successfully retrieved from the Registry Database that is stored on the mass storage device 118 and that the retrieved passwords can be successfully decrypted. Moreover, the computer system 100 in an exemplary embodiment causes the first password to be displayed upon the video display 120 in both its encrypted form and its decrypted form so that the technician configuring the computer system 100 may make a visual verification that the computer system 100 can successfully retrieve and decrypt passwords of the password list.

The computer system 100 then in step 440 disables removal of the payment assurance application for the computer system 100. In an exemplary implementation of the payment assurance application, the login service and monitoring service are implemented with a single executable file. After being powered-up, the computer system 100 either is executing the executable file for the payment assurance program or is not operable to receive user input. Microsoft™ Windows™ operating systems do not allow users to delete files which are currently being accessed by the operating system such as the executable file for the payment assurance program. Accordingly, since from the users standpoint, the computer system 100 is constantly executing the executable file for the payment assurance application, the Microsoft™ Windows™ operating systems inherently prevents the user from removing the executable file for the payment assurance application from the mass storage device 118.

A user may, however, attempt to reformat the mass storage device 118 in order to remove the payment assurance application from the mass storage device 118. In order to prevent removal of the payment assurance application from the computer system 100 via reformatting the mass storage device 118, the computer system 10 disables the format command for MS-DOS commandline of the Microsoft™ Windows™ operating system. In particular, the computer system 100 encrypts the executable file of the MS-DOS format command, renames the encrypted executable file to a non-descriptive name, and moves the renamed and encrypted executable file to a non-standard location on the mass storage device 118. As a result of the above changes to the format command, average users should have a difficult time locating and executing the format command of the Microsoft™ Windows™ operating system while at the same time maintaining a copy of the format command on the mass storage device 118 so that the format command may be automatically re-enabled after the user makes the last payment of the payment schedule.

As a result of disabling the format command of the Microsoft™ Windows™ operating system, a user cannot simply execute the format command stored upon the mass storage device 118 in order to reformat the mass storage device 118 and circumvent the payment assurance application. However, a user is still able to format removable media such as floppy disks via a the Microsoft™ Windows™ format interface. The Microsoft™ Windows™ format interface inherently forbids a user from reformatting the disk partition from which the Microsoft™ Windows™ operating system booted. Accordingly, the combination, of disabling the Microsoft™ Windows™ format command and functionality inherent to Microsoft™ Windows™ format interface, prevents a user of the computer system 100 from circumventing the payment assurance application by reformatting the mass storage device 118 while at the same time permitting the user to format other storage media such as floppy disks or a second hard drive.

The computer system then in step 442 requests the technician to enter contact information such as a business name and phone number and saves the received contact information in a persistent manner. The payment assurance application utilizes the supplied information to provide a user of the computer system 100 with contact information in case the user encounters problems with the computer system 100, needs to obtain a password, has questions concerning the computer system 100, or has questions concerning the payment schedule.

In step 444, the computer system 100 terminates execution of the setup program and forces execution of the payment assurance application. To this end, the computer system 100 in an exemplary embodiment invokes execution of a reboot operation which causes the computer system 100 to terminate all executing processes and to invoke the payment assurance application as part of a subsequent startup operation. As a result of executing the reboot operation, the computer system 100 executes a shutdown process which causes the computer system 100 to terminate execution of all executing processes and to subsequently invoke a system startup process. Accordingly, after the to computer system 100 completes execution of the setup method 400, the computer system 100 will automatically execute the payment assurance program in accordance with the supplied payment schedule information and associated password list.

Figure 5A:
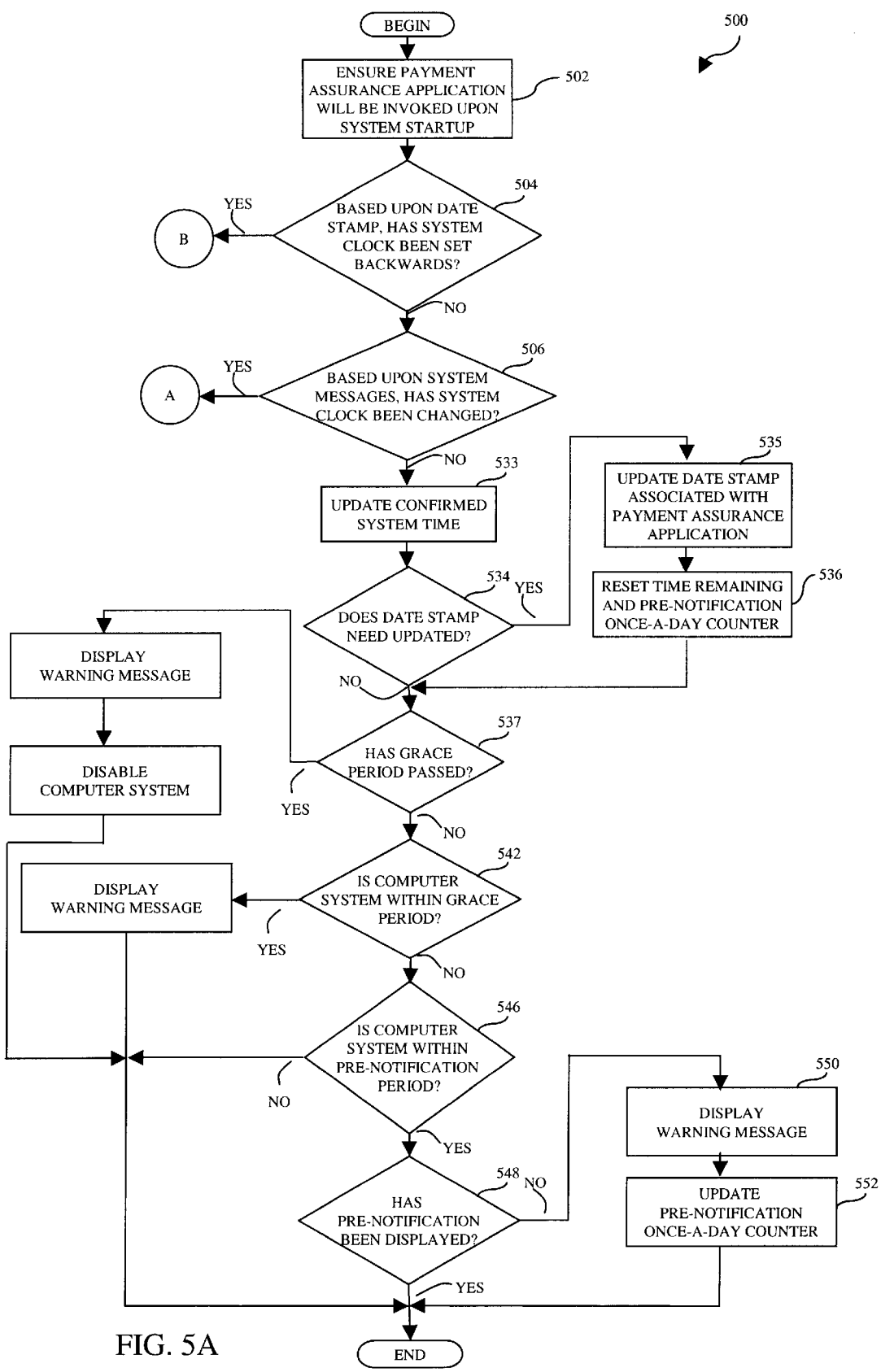
FIGS. 5A–5B shows a flowchart of a monitoring method of the payment assurance application used to monitor activities performed on the computer system of FIG. 1.
Figure 5B:
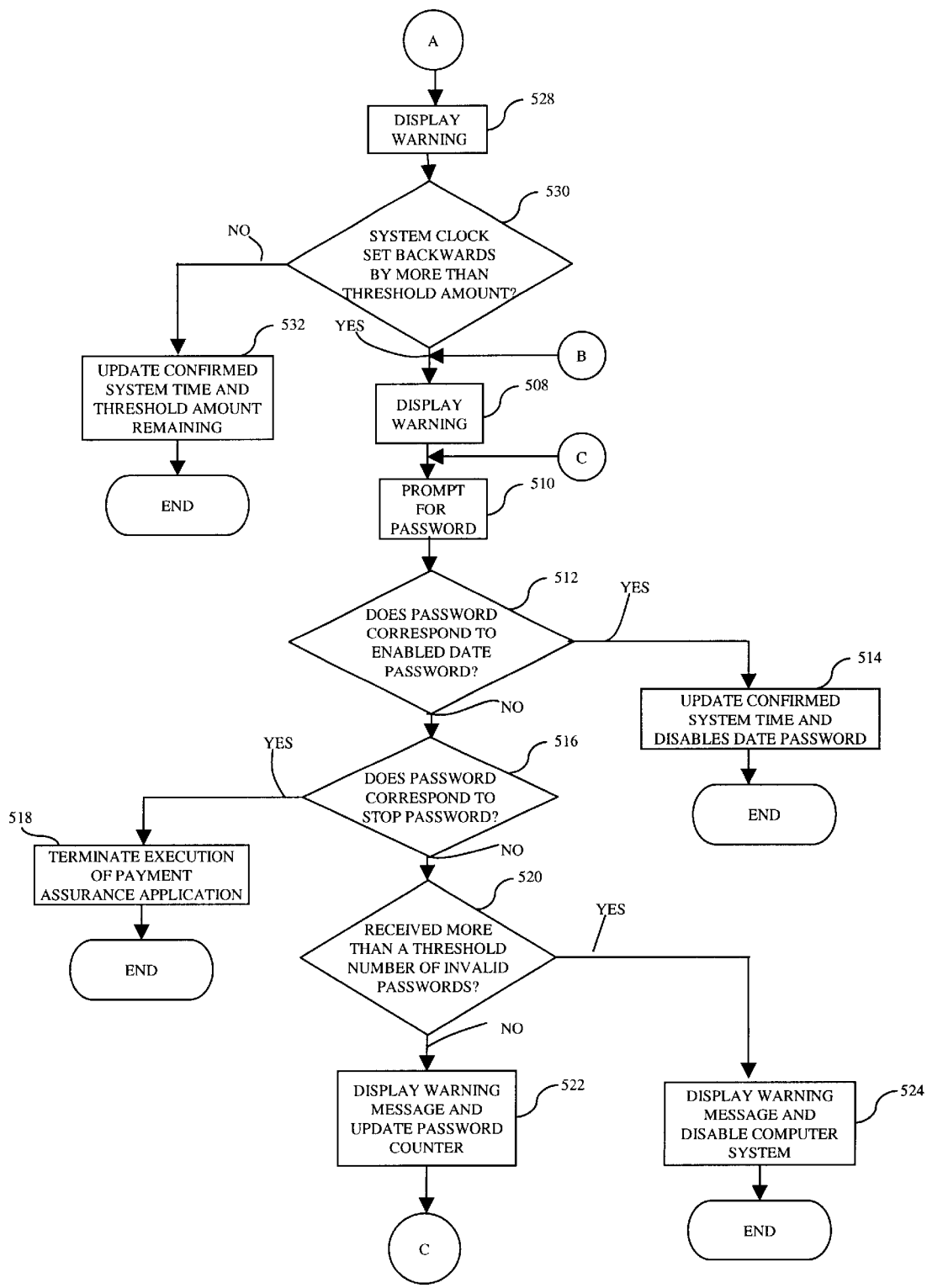

In general, once the user has entered the proper password for the current payment period, the computer system 100 essentially invokes a monitoring service of the payment assurance application that causes the computer system 100 to periodically verify that the user has not perform certain operations that could circumvent the payment assurance application. Referring now to FIGS. 5A–5B, there is depicted a monitoring method 500 which the computer system 100 executes on a periodic basis such as every 500 milliseconds. However, those skilled in the art should appreciate that monitoring method 500 may be implemented in various other manners which may include multiple interrupt service routines, polling routines, hardware timers, and/or software timers. For example, an exemplary embodiment of the monitoring method 500 utilizes a 500 millisecond timer that upon expiration causes the computer system 100 to verify a first set of conditions and a 1000 millisecond timer that upon expiration causes the computer system 100 to verify a second set of conditions.

Upon each periodic execution of the monitoring method 500, the computer system 100 in step 502 ensures that execution of the payment assurance application will be invoked as part of the system startup process. To this end, the computer system 100 in an exemplary embodiment updates the "Run" and "RunOnce" keys of the Registry Database with entries that properly reference the monitoring service and login service of the payment assurance application, respectively. In this manner, the computer system 100 effectively prevents a user from configuring the computer system 100 to not 30 invoke execution of the payment assurance application upon system startup. In particular, assuming the computer system 100 updates the "Run" and "RunOnce" keys of the Registry Database on a relatively short interval such as 500 millisecond, even if the user were to delete or alter the entries of the Registry Database the periodic execution of the monitoring method 500 would effectively update the "Run" and "RunOnce" entries to proper values before the user could terminate the monitoring service by restarting or powering-down the computer system 100.

One manner by which users may attempt to circumvent the payment assurance application is by setting the system clock 126 backwards to a date prior to an overdue payment date. Users may utilizes various different techniques in an attempt to set the system clock 126. Accordingly, the computer system 100 in an exemplary embodiment performs several tests to ensure that the user has not attempted to change the system clock 126 of the computer system 100. In particular, the computer system 100 in step 504 determines base upon the date as indicated by the system clock 126 and a date stamp associated with the program assurance application whether the system clock 126 has been set backwards. More specifically, the computer system 100 determines that the system clock 126 has been set backwards if the date indicated by the system clock 126 is earlier then the date indicated by the date stamp of the program assurance application.

If the computer system 100 determines in step 504 that the system clock 126 has been set backwards, then the computer system in step 508 displays a warning message that indicates changes to the system clock 126 are prohibited and provides contact information for an organization from which a password that re-enables the computer system 100 may be obtained.

After displaying the warning message for a few seconds, the computer system 100 in step 510 prompts the user for a password. If the computer system 100 determines in step 512 that a user entered a proper date password, then the computer system 100 in step 514 updates a confirmed system time for the computer system 100, disables the entered date password from being used again, and exits the monitoring method 500 until the next periodic execution of the monitoring method 500. To this end, the computer system 100 determines that the received password is a proper date password if the entered password corresponds to a non-disabled date password of the password list. Moreover, upon determining that the received password is a proper date password, the computer system 100 in an exemplary embodiment sets a flag associated with the date password that disables the date password from being used again. Furthermore, the computer system 100 in an exemplary embodiment stores the confirmed system time of the system clock 126 in a key of the Registry Database in order to maintain a persistent copy of the last confirmed system time.

However, if the computer system 100 determines that a user did not enter a proper date password, then the computer system 100 determines in step 516 whether the user entered the stop password. If the computer system 100 determines that the user entered the stop password, then the computer system 100 in step 518 terminates the current execution of the program assurance application in a manner similar to above step 314 of FIG. 3.

If the computer system 100 determines in step 516 that the user did not enter the stop password, then the computer system 100 in step 520 determines whether more than a threshold number (e.g. 3) of invalid passwords have been entered. If the computer system 100 determines that more than the threshold number of invalid passwords have not been entered, then the computer system 100 in step 522 updates a password counter, displays a warning that indicates the last password was invalid, and returns to step 510 in order to receive another password from the user. However, if the computer system 100 determines that more than the threshold number of invalid passwords have been entered, then the computer system 100 in step 524 displays a warning message that indicates the password was invalid, and disables use of the computer system 100. To this end, the computer system 100 in an exemplary embodiment invokes execution of a system shutdown process that causes the computer system 100 to terminate execution of all executing processes.

The Microsoft™ Windows™ environment provides various utility programs for setting the system clock 126. A user could potentially circumvent the protection of the payment assurance application by setting the system clock 126 backwards via these configuration utilities. Whenever one of the Microsoft™ Windows™ utility programs changes the system clock 126, a Microsoft™ Windows™ API message is generated which informs other applications of the change to the system clock 126. Accordingly, if the computer system 100 in step 504 determined based upon the date stamp that the system clock 126 had not been set backwards, then the computer system 100 in step 526 further determines whether the system clock 126 had been changed based upon Microsoft™ Windows™ API messages generated by the configuration utilities.

If the computer system 100 determines in step 526 that the system clock 126 has changed, then the computer system 100 in step 528 displays a warning that indicates changes to the system clock 126 are prohibited. The computer system 100 then in step 530 determines whether the system clock has been set backwards by more than a threshold amount (e.g. 15 minutes) within a predetermined period (e.g. 24 hours). To this end, the computer system 100 determines whether the time difference between the current system time as indicated by the system clock 126 and the last confirmed system time is greater than the threshold amount remaining for the predetermined period.

If the computer system 100 in step 530 determines that the system clock 126 has been set backwards by more than the threshold amount within the predetermined period, then the computer system 100 proceeds to step 508 in order to display a warning and receive a password from the user. However, if the computer system 100 determines that the system clock 126 has not been set backwards by more than the threshold amount within the predetermined period, then the computer system 100 in step 532 updates the threshold amount remaining for the predetermined period and exits the monitoring method 500 until the next periodic execution of the monitoring method 500. To this end, the computer system 100 in an exemplary embodiment subtracts the time difference from the threshold amount remaining, encrypts the obtained difference, and stores the encrypted difference in a non-volatile manner. More specifically, the computer system 100 stores the encrypted difference in a key of the Registry Database for future access by the computer system 100.

After verifying the payment assurance application will be invoked upon system startup and the system clock 126 has not been changed by the user, the computer system 100 in step 533 updates the confirmed system time to the system time indicated by the system clock 126. More specifically, the computer system 100 in an exemplary embodiment updates the confirmed system time in a persistent manner by storing the system time in a key of the Registry Database.

The computer system 100 then in step 534 determines whether the date stamp associated with the payment assurance application needs to be updated. In particular, if the confirmed system time indicates a date later than the date stamp for the payment assurance application, then the computer system 100 in step 535 updates the date stamp for the payment assurance application. More specifically, the computer system 100 in an exemplary embodiment updates the data stamp by storing the date indicated by the confirmed system time on the mass storage device 118 in a header portion of an executable file used to implement the payment assurance application.

In step 536, the computer system 100 resets the time amount remaining for the predetermined period and the pre-notification counter. In an exemplary embodiment, the computer system 100 provides a pre-notification warning once each day the computer system 100 is within a pre-notification period. Accordingly, by resetting the pre-notification counter upon determining the date has changed ensures that the pre-notification warning message is display only once a day. Similarly, the computer system 100 in an exemplary embodiment allows the system clock 126 to be set backwards by no more than a threshold amount within a predetermined period of a day. Accordingly, resetting the time amount remaining upon determining that the date has changed ensures that the system clock 126 may be set backwards by the threshold amount each predetermined period. The predetermined period and the pre-notification period may be implemented with separate and different time intervals. Furthermore, those skilled in the art in light of the description herein may implement other time intervals for the predetermine period and the pre-notification using known techniques and without undue experimentation.

The computer system 100 then in step 537 determines whether the grace period has passed. To this end, the computer system 100 determines based upon the entered payment password, the stored payment schedule information, and the system clock 126 whether the grace period has passed. For example, if the stored payment schedule information defines monthly payments due on the $1^{st}$ of each month and a 10 day grace period, then the computer system 100 would determine the grace period had passed in response to the user entering the correct payment password for March 1999 and the system clock 126 indicating the date as Apr. 11, 1999. If the computer system 100 determines that the grace period has passed, then the computer system 100 in step 538 displays a warning message that indicates the current installment period is past due and provides contact information of the organization to which payment is to be made. After displaying the warning message for a few seconds, the computer system 100 in step 540 disables use of the computer system 100.

If the computer system determines in step 537 that the grace period has not yet passed, then the computer system 100 in step 542 determines whether the grace period has been entered. To this end, the computer system 100 determines based upon the entered payment password, the stored payment schedule information, and the system clock 126 whether the grace period has been entered. For example, if the stored payment schedule information defines weekly payments due on Sunday of each week and a 10 day grace period, then the computer system 100 would determine the grace period had been entered in response to the user entering the correct payment password for the week beginning Sunday, Oct. 10, 1999 and the system clock 126 indicating the date as Oct. 18, 1999. If the computer system 100 determines that the grace period has been entered, then the computer system 100 in step 544 displays a warning message that indicates the current periodic payment is past due and provides contact information for the organization to which payment is to be made.

However, if the computer system 100 determines that the grace period has not been entered, then the computer system 100 in step 546 determines whether the pre-notification period (e.g. 3 days before payment due date) has been entered. To this end, the computer system 100 determines based on the entered payment password, the stored payment schedule information, and the system clock 126 whether the pre-notification period has been entered. For example, if the stored payment schedule information defines monthly payments due on the first of each month and a 3 day pre-notification period, then the computer system 100 would determine that the pre-notification period had been entered in response to the user entering the correct password for the month of September and the system clock 126 indicating the date as Sep. 30, 1999.

If the computer system 100 determines that the pre-notification period has been entered, then the computer system 100 in step 548 determines based upon a pre-notification counter and the system clock 126 whether the a pre-notification warning message has been displayed for the current date. If the computer system 100 determines that the pre-notification warning has already been displayed for the current date, then the computer system 100 exits the monitoring method until the next periodic execution of the monitoring method 500. However, if the computer system 100 determines that the pre-notification warning has not been display for the current date, then the computer system 100 in step 550 displays a warning message that indicates the date by which the next periodic payment is due. The computer system then in step 552 updates the pre-notification counter in order to prevent the pre-notification warning from being displayed again for the current date.

Since the computer system 100 executes the monitoring method 500 on a periodic basis, the computer system 100 in an exemplary embodiment causes the grace period warning to be displayed each time the computer system 100 periodically executes the monitoring method 500. If the computer system 100 is configured to execute the monitoring method on a relatively short interval such as 500 millisecond, then the computer system 100 will essentially cause the grace period warning to be continually displayed once the grace period is entered. It should be appreciated, however, that the grace period warning may be implemented in a less intrusive manner similar to the pre-notification warning by utilizing a grace period counter that causes the grace period message to be displayed less frequently such as once a day, once an hour, or once every 15 minutes.

Figure 6:
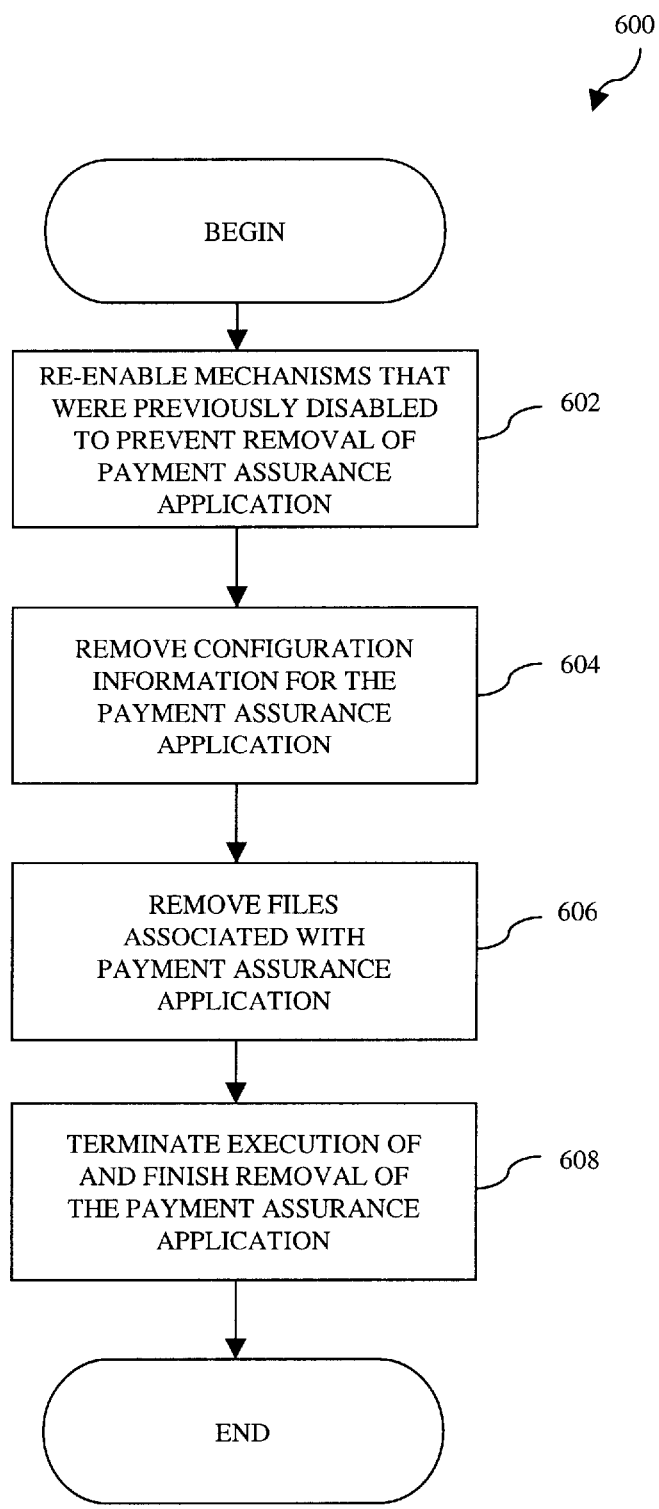
FIG. 6 shows a flowchart of a removal method of the payment assurance application used to remove the payment assurance application from the computer system of FIG. 1.

A program removal method 600 is illustrated in FIG. 6. In general, the computer system 100 executes the program removal method 600 in response to receiving the payment password for the last payment period. As depicted in FIG. 6, the computer system 100 in step 602 re-enables mechanisms which were previously disabled in order to prevent the user from removing the payment assurance application from the computer system 100. More specifically, the computer system 100 in an exemplary embodiment re-enables the MS-DOS format command. To this end, the computer system 100 un-encrypts the format command, renames the format command to its standard filename, and stores the un-encrypted and properly named format command in its standard location on the mass storage device 118.

In step 604, the computer system 100 removes stored configuration information for the payment assurance application from the computer system 100. In particular, the computer system 100 removes the password lists, the payment schedule information, the confirmed system time information, and mechanisms for ensuring execution of the payment assurance application upon startup. More specifically, the computer system 100 in an exemplary embodiment removes the references to the payment assurance application from the "Run" and "RunOnce" keys of the Registry Database. Furthermore, the computer system 100 in the exemplary embodiment removes all other keys of the Registry Database associated with the payment assurance applications such as keys used to store the password lists, confirmed system time, and payment schedule information.

The computer system 100 then in step 606 removes all files associated with the payment assurance application from the computer system 100. In an exemplary embodiment, the computer system 100 essentially deletes the executable file used to implement the payment assurance application from the mass storage device 118.

After removing the configuration information and files associated with the payment assurance application, the computer system 100 in step 608 invokes a reboot operation in order to cause the computer system 100 to terminate all executing processes and to complete the removal of the payment assurance program from the computer system 100.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit of the invention are desired to be protected. For example, the exemplary embodiment of the payment assurance application automatically removes itself from the computer system 100 upon entering the password associated with the last payment which is advantageous for purchase-over-time agreement. However, the payment assurance application may be implemented to automatically disable the computer system 100 after the last day of the payment schedule which may be advantageous for lease arrangements where the user is to return the computer system 100 at the termination of the lease.

What is claimed is:

1. A method of encouraging timely periodic payments that are associated with a computer system, comprising the steps of:
   storing a plurality of passwords in said computer system, each password of said plurality of passwords associated with a separate payment period;
   determining based upon said plurality of passwords whether a supplied password corresponds to a current payment period;
   monitoring a system time of the computer system to determine if the system time has been changed in an unauthorized manner; and
   enabling use of said computer system based upon determining that said supplied password corresponds to said current payment period and upon determining that the system time has not been changed in said unauthorized manner.

2. The method of claim 1, further comprising the step of:
   disabling use of said computer system based upon determining that said supplied password does not correspond to said current payment period.

3. The method of claim 1, further comprising the step of:
  terminating execution of all processes on said computer system based upon determining that said supplied password does not correspond to said current payment period.

4. The method of claim 1, further comprising the step of determining whether said supplied password corresponds to a predetermined grace period associated with said current payment period, wherein said enabling step further comprises the step of:
  enabling use of said computer system based further upon determining that said supplied password corresponds to said predetermined grace period associated with said current payment period.

5. The method of claim 1, further comprising the steps of:
  in response to determining that said supplied password corresponds to said current payment period, determining whether said computer system is within a pre-notification period associated with a second payment period that immediately follows said current payment period, and
  displaying a warning message concerning said second payment period in response to determining that said computer system is within said pre-notification period associated with said second payment period.

6. The method of claim 1, further comprising the step of disabling said computer system based upon determining that said system time has been changed in said unauthorized manner.

7. A method of encouraging timely payments associated with a computer system including a user input device, a processor and a system clock, the method comprising:
  executing an application with the processor of the computer system during a startup process of the computer system, the application configured to determine whether a payment is associated with the computer system based in part on a value of the system clock of the computer system;
  disabling at least a portion of the user input device during the startup process of the computer system; and
  enabling use of the computer system based upon determining that a payment is associated with the computer system.

8. The method of claim 7, wherein appropriate references to the application are added to a registry database of the computer system such that the application is executed during the startup process of the computer system.

9. The method of claim 8, wherein the appropriate references are added to at least one of a Run key of the registry database and a Run Once key of the registry database.

10. The method of claim 8, wherein the appropriate references are configured to permit the computer system to complete the startup process based upon a determination that a payment is associated with the computer system.

11. The method of claim 7, wherein the user input device is a keyboard and at least one key combination is disabled, the at least one key combination configured to cause the computer system to perform a function selected from the group consisting of the computer system switching between a first executing process and a second executing process and the computer system prematurely terminating the application.

12. The method of claim 11, wherein the keyboard includes an Alt key, a Tab key, a first function key, a Ctrl key, an Esc key and a Delete key, and the at least one key combination includes at least one of the Alt key, the Tab key, the first function key, the Ctrl key, the Esc key and the Delete key.

13. The method of claim 7, further comprising the step of disabling use of the computer system based upon determining that a payment is not associated with the computer system.

14. The method of claim 7, wherein determining whether a payment is associated with the computer system comprises the steps of:
  receiving a first password with the user input device of the computer system;
  selecting a second password stored on the computer system based on the value of the system clock; and
  comparing the first password and the second password, the payment being associated with the computer system if the first password and the second password are equal.

15. The method of claim 7, wherein the computer system further includes a display and further comprising the steps of:
  determining whether the value of the system clock is within a pre-notification period;
  generating a pre-notification warning if the value of the system clock is within the pre-notification period; and
  displaying the pre-notification warning on the display of the computer system.

16. The method of claim 7, wherein the computer system further includes a display and further comprising the steps of:
  determining whether the value of the system clock is within a grace period;
  generating a warning message if the value of the system clock is within the grace period; and
  displaying the warning message on the display of the computer system.

17. The method of claim 7, further comprising the steps of:
  monitoring the system clock to determine if the system clock has been changed in unauthorized manner; and
  disabling use of the computer system if the system clock has been changed in an unauthorized manner.

18. A method of encouraging timely payments, the method comprising:
  providing a computer system configured to execute user processes, the computer system comprising a processor operably coupled to a system clock, a user input device, a mass storage device, and a memory; and
  installing an application on the computer system, the application configured to be executed with the processor of the computer system at least to determine whether a payment is associated with the computer system based in part on a value of the system clock of the computer system, and to enable use of the computer system based upon determining that a payment is associated with the computer system.

19. The method of claim 18, wherein the step of installing the application comprises the steps of:
  copying the application to the computer system; and
  updating configuration information of the computer system, such that the application is executed during a startup process of the computer system.

20. The method of claim 19, wherein the step of updating the configuration information of the computer system comprises the step of adding appropriate references to the application in a registry database of the computer system.

21. The method of claim 20, wherein appropriate references to the application are added to at least one of a Run key of the registry database and a Run Once key of the registry database.

22. The method of claim 21, wherein the application is further configured to disable use of the computer system based upon determining that a payment is not associated with the computer system.

23. The method of claim 22, wherein the computer system is disabled by the application preventing the completion of the startup process of the computer system.

24. The method of claim 18, wherein determining whether a payment is associated with the computer system, comprises the steps of:
   receiving a first password with the user input device of the computer system;
   selecting a second password stored on the computer system based on the value of the system clock; and
   comparing the first password and the second password, the payment being associated with the computer system if the first password and the second password are equal.

25. The method of claim 18, wherein the computer system further comprises a display and further comprising the steps of:
   determining whether the value of the system clock is within a pre-notification period;
   generating a pre-notification warning if the value of the system clock is within the pre-notification period; and
   displaying the pre-notification warning on the display of the computer system.

26. The method of claim 18, wherein the computer system further comprises a display and further comprising the steps of:
   determining whether the value of the system clock is within a grace period;
   generating a warning message if the value of the system clock is within the grace period; and
   displaying the warning message on the display of the computer system.

27. The method of claim 18, further comprising the steps of:
   monitoring the system clock to determine if the system clock has been changed in an unauthorized manner; and
   disabling use of the computer system if the system clock has been changed in an unauthorized manner.

* * * * *